United States Patent [19]
Pratt et al.

[11] Patent Number: 4,537,542
[45] Date of Patent: Aug. 27, 1985

[54] WEDGE-TYPE LOW PROFILE FASTENER

[75] Inventors: John D. Pratt, Rancho Cucamonga; Raymond Ramirez, Valinda, both of Calif.

[73] Assignee: Monogram Industries, Inc., Providence, R.I.

[21] Appl. No.: 602,224

[22] Filed: Apr. 19, 1984

[51] Int. Cl.³ .............................................. F16B 13/04
[52] U.S. Cl. ........................................ 411/55; 411/45; 411/60; 411/77; 24/607
[58] Field of Search ............... 411/44, 21, 45, 49, 411/55, 57, 60, 63, 64, 72, 75–80, 347, 354–358; 24/606–608, 453; 279/2 R

[56] References Cited

U.S. PATENT DOCUMENTS 4,192,044  3/1980  Ballerini .............................. 24/607

FOREIGN PATENT DOCUMENTS 596065  4/1960  Canada ................................ 411/21
839089  6/1960  United Kingdom ................. 24/453

Primary Examiner—Kenneth J. Dorner
Assistant Examiner—Neill Wilson
Attorney, Agent, or Firm—Poms, Smith, Lande & Rose

[57] ABSTRACT

A wedge-type low profile fastener is disclosed which is adapted to be inserted into aligned apertures in a pair of abutting surfaces. A hex head is provided on the fastener which is engageable by a tool to rotate the same. Such rotation moves a screw having a pair of spaced wires coupled thereto with a spreader between the wires. As the screw is moved, the wires move along the spreader wedging the spreader between the wires. This moves the wires outwardly against the non-accessible surfaces of the apertures thereby holding the fastener secure in the apertures until the wedging action is removed. The fastener presents a low profile so that the hex head does not stick out too far while retaining a predetermined grip range for the wires.

10 Claims, 12 Drawing Figures

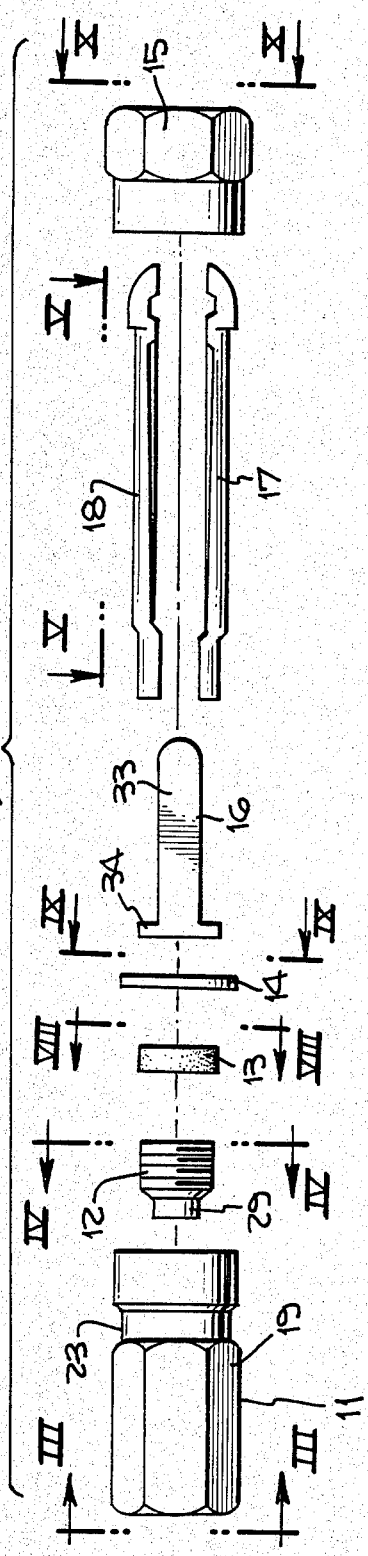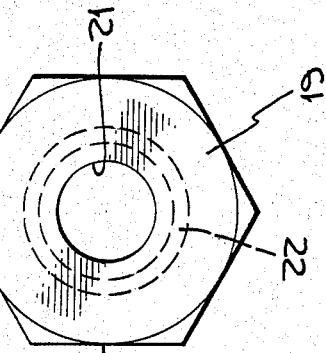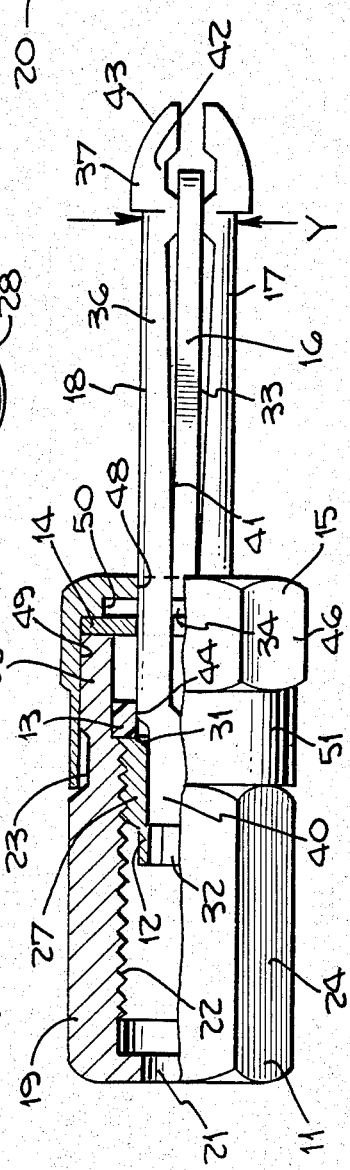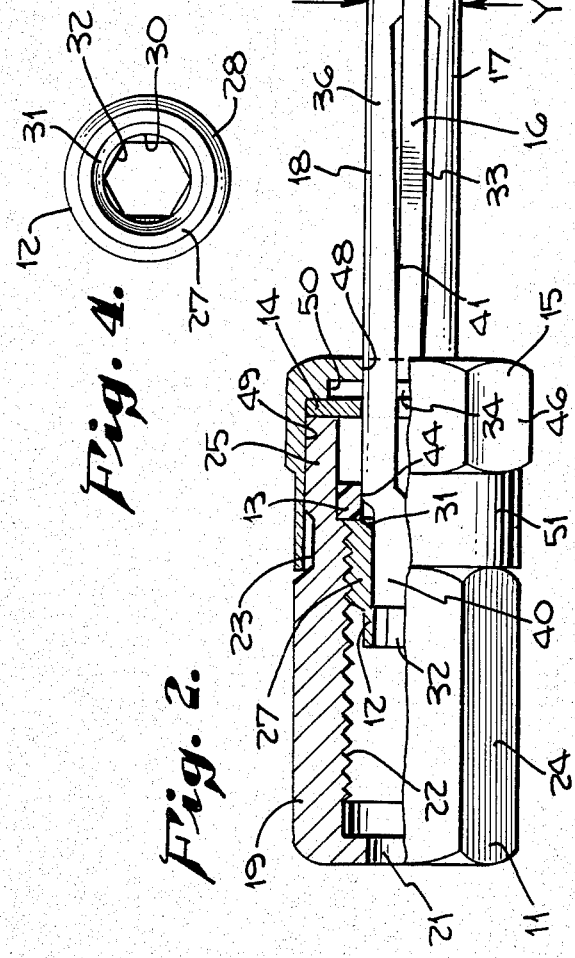

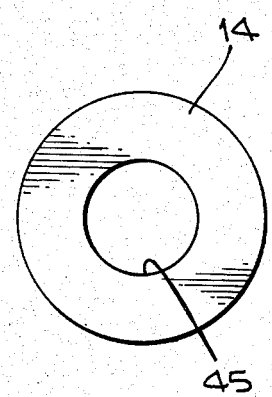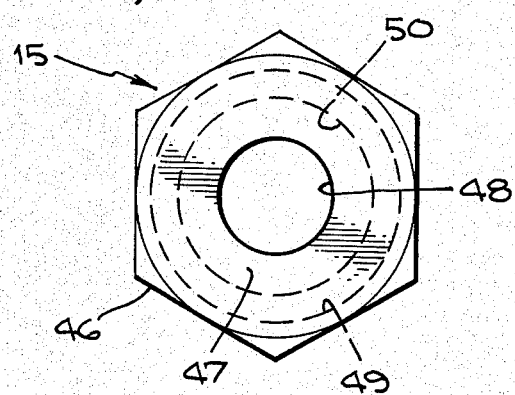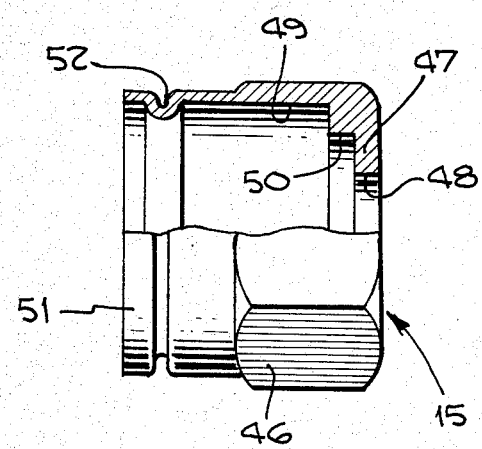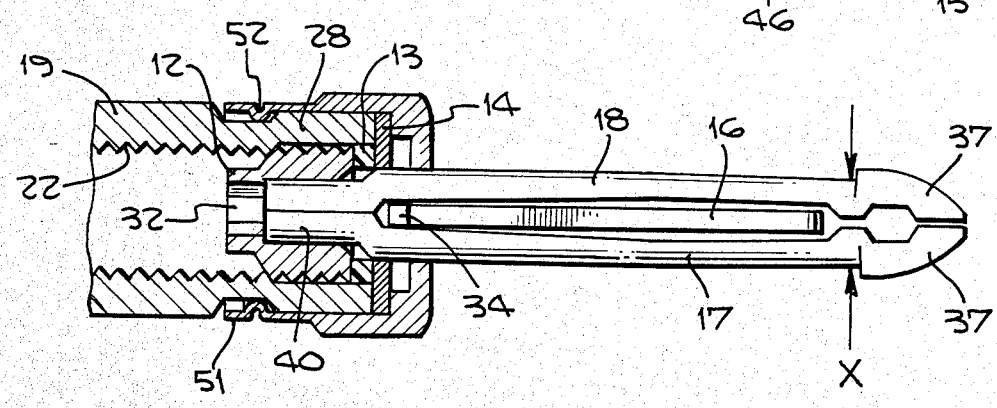

WEDGE-TYPE LOW PROFILE FASTENER

BACKGROUND OF THE INVENTION

1. Field of the Invention

The invention relates to fasteners, and, more particularly, to wedge-type fasteners used to temporarily secure two abutting sheets together permitting permanent fasteners to be installed.

2. Description of the Prior Art

Wedge-type fasteners are known in the art which are used to hold together two abutting surfaces or sheets temporarily while permanent fasteners are installed. Such prior art fasteners generally include a screw having a screw head and a hex body threaded thereon engagable by a tool and a pair of spaced wire elements extending out of the hex body. These elements are insertible into aligned apertures in the sheets or surfaces it is desired to secure together. The hex body is outside of the apertures and the body is held by the tool while a nut or the like on the screw between the screw head and hex body is rotated to move the spaced wire elements connected to the screw thereby spreading the wire elements outwardly as the spreader separates the wire elements and the wires move outwardly against the adjacent aperture surfaces. Permanent fasteners may now be installed in any suitable manner and the hex body held and the nut rotated to release the wires and enable removal of the fastener.

These fasteners have particular application in the aircraft art and, in this art, automation in the form of power tools or machines are used to install the permanent fasteners. In the prior art fasteners discussed above, an appreciable portion of the fastener sticks out from the surfaces in which the wire elements are inserted. As the tool or machine comes along to install the permanent fasteners, the tool or machine must be backed up to avoid the hex body and other protruding portions of the wedge-type fastener. Since the hex body must be long enough to accommodate the length of the wire elements, the body must be at least that long and the fastener must also include the screw head and nut for carrying out the foregoing installation operation. The length of the wire elements provides the gripping range for the fastener and thus such range cannot be reduced arbitrarily since predetermined grip ranges may be required in the area of installation. It can be appreciated that the automatic installation of the permanent fasteners is impeded by the protruding heads of the prior art wedge-type fasteners. Much time is lost by the need to back up the machine to avoid the protruding head. There is a need for a wedge-type fastener that provides the necessary grip range yet presents a low profile to the installer.

SUMMARY OF THE INVENTION

It is an object of this invention to provide an improved wedge-type fastener having a predetermined grip range while presenting a low profile.

It is a further object of this invention to provide a wedge-type fastener having the same grip range of prior art fasteners but shorter protruding components.

These and other objects are preferably accomplished by providing fastener having a hex body engagable by a tool to rotate the same. Such rotation moves a screw having a pair of spaced wires coupled thereto with a spreader between the wires. As the screw is moved, the wires move along the spreader wedging the spreader between the wires. This moves the wires outwardly against the non-accessible surfaces of the apertures thereby holding the fastener secure in the apertures until the wedging action is removed. The fastener presents a low profile so that the hex head does not stick out too far while retaining a predetermined grip range for the wires.

BRIEF DESCRIPTION OF THE DRAWING

FIG. 1 is an exploded view of the wedge-type fastener of the invention;

FIG. 2 is an assembled view of the fastener of FIG. 1;

FIG. 3 is a view taken along lines III—III of FIG. 1;

FIG. 4 is a view taken along lines IV—IV of FIG. 1;

FIG. 9 is a view taken along lines IX—IX of FIG. 1;

FIG. 10 is a view taken along lines X—X of FIG. 1;

FIG. 11 is a vertical view of one of the components of FIG. 1 after crimping; and FIG. 12 is a vertical cross-sectional view of a portion of the fastener of FIG. 1 illustrating the assembly of parts.

DESCRIPTION OF THE PREFERRED EMBODIMENT

Figure 5:
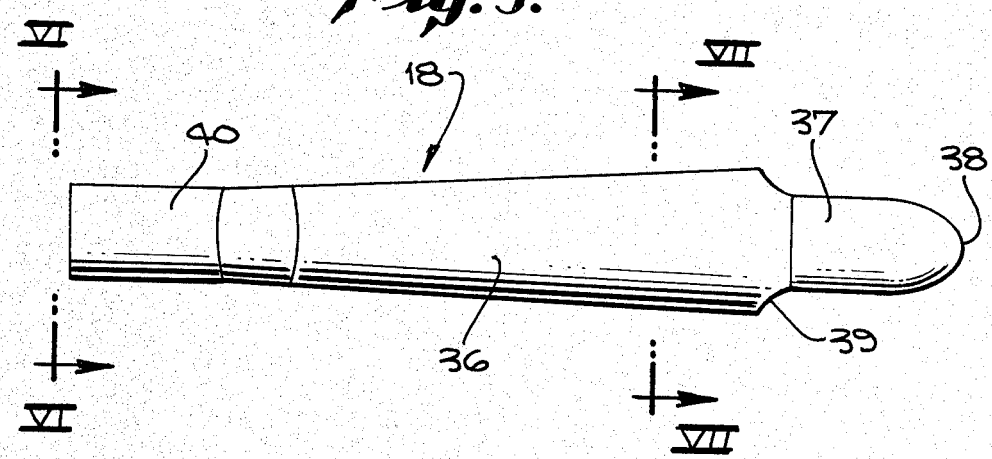
FIG. 5 is a view taken along lines V—V of FIG. 1.

Referring now to FIG. 1 of the invention, the fastener 10 is comprised of a hex body 11, a screw 12, a spring 13, a washer 14, a hex cap 15, a spreader 16 and a pair of wires 17 and 18. The assembled fastener 10 is shown in FIG. 2.

Referring again to FIG. 1, hex body 11 includes a main body portion 19 having an outer hex configuration 20 (FIG. 3) and an inner throughbore 21. Throughbore 21 is threaded at 22 and includes an annular groove 23 on the outer periphery thereof. As can be seen in FIG. 1, the outer diameter of portion 24 of body 11 is slightly greater than the outer diameter of portion 25 thereof. Also, a shoulder 26 is formed at the intersection of groove 23 and portion 24.

Referring again to FIG. 1, screw 12 includes a main body portion 27 (see also FIG. 2) threaded on the outer surface thereof at surface 28 and a generally cylindrical section 29. Screw 12 is generally smooth-walled on the interior thereof, at wall 30, having a tapered section 31 leading thereto. A hexagonally shaped socket 32 (see also FIG. 4) is provided at the other end of screw 12.

Referring again to FIG. 1, spreader 16 is a generally thin flat piece of metal or the like having an elongated portion 33 and a cross-tee 34 at one end and curved at the other end 35.

Figure 6:
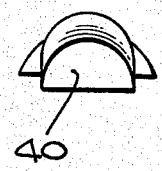
FIG. 6 is a view taken along lines VI—VI of FIG. 5.
Figure 7:
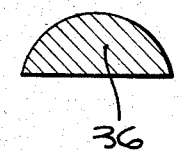
FIG. 7 is a view taken along lines VII—VII of FIG. 5.

The pair of wires 17, 18 are mirror images of each other and thus only one need be discussed. Each wire includes a generally tapered elongated body portion 36 (FIG. 2) having a terminal end 37 curving at 38 and a flat end 40 (FIG. 1) at the other end. A gradually tapering shoulder 39 (FIG. 5) is provided between portion 36 and end 37. The cross section through body portion 36 is generally semi-circular (FIG. 7) and, as seen in FIGS. 1 and 6, the height of section 40 is less than the greatest height of section 36 which tapers toward end 37. A reduced area 41 is provided on the underside of each wire between end 40 and end 37. A groove 42 is also provided on the underside of wire 18 at end 37, the end 37 curving at surface 43 as shown.

Figure 8:
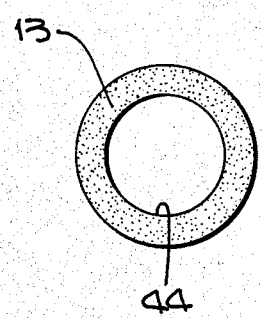
FIG. 8 is a view taken along lines VIII—VIII of FIG. 1.

Referring again to FIG. 1, spring 13 is a generally annular ring having throughbore 44 (FIG. 8). Washer 14 is also a generally annular ring (FIG. 9) having a throughbore 45.

Cap 15 includes a main body portion 46 (FIG. 11) having an end wall 47 (FIG. 10) with aperture 48 therethrough. Cap 15 is smooth-walled on the interior having bore 49 with a reduced smooth-walled portion 50 between bore 49 and aperture 48. A reduced outer diameter body portion 51 is integral with and extends from main body portion 46 (bore 49 extending through both portions 46 and 51) and is of a lesser outer diameter than portion 46. An annular groove 52 is provided in portion 51. As shown in FIGS. 10 and 11, portion 46 is hexagonally-shaped on the outside thereof and portion 51 is smooth-walled on the exterior thereof.

The assembly of the parts illustrated in FIG. 1 will now be described. The ends 40 of wires 17, 18 are soldered into the screw 12 as shown. That is, ends 40 abut against each other inside of screw 12 and are soldered therein.

Screw 12 is now adapted to be threaded into body 11, the threads 28 adapting to mating with threads 22. Spring 13 is placed over wires 17, 18 adjacent screw 12 as shown in FIG. 12, and washer 14 is inserted over wires 17, 18 adjacent spring 13. Spacer 16 is inserted between the pair of wires 17, 18 as shown in FIG. 2. End cap 15 is now inserted onto wires 17, 18 past ends 37 until section 51 with groove 52 thereon reaches groove 23. Section 51 is now compressed down into groove 23 to lock cap 15 to body 11 and thus all of the components together as shown in FIG. 2.

In operation, the components are in the FIG. 12 position. The hexagonally shaped portion 20 of body 11, and the hexagonally shaped portion 47 of cap 15 and hexagonally shaped portion 32 of screw 12 are held by suitable tools and body 11 is rotated with respect to the others. Such rotation rotates body 11 from the position shown in FIG. 12 to the right thereof whereby screw 12 threads into body 11, as shown in FIG. 2, thereby moving wires 17, 18 to the left in FIG. 12. Spacer 16 moves between ends 37 forcing wires 17, 18 apart as shown in FIG. 2. It can be appreciated that the overall diameter or width X in FIG. 12 is less than the width Y in FIG. 2 so that, if wires 17, 18 when in the FIG. 12 position are inserted into an aperture in close fitting relationship, the wires 17, 18 move outwardly away from spacer 16, as shown in FIG. 2, to the width Y forcing themselves against the blind side of such aperture. Of course, reversal of rotation of body 11 restores fastener 10 to the FIG. 12 position as screw 12 unthreads from engagement with body 11.

Any suitable materials may be used, such as aluminum, various metals, alloys, etc. Spring 13 may be any suitable resilient means and of any suitable materials, such as rubber. Washer 14 may be a steel thrust washer. Wires 17, 18 may be steel wires of any suitable dimensions. The hexagonally shaped portions of body 11, cap 15 and screw 12 are only recited as such for engagement by a suitable tool amd may be of any type of configuration so that wrenching flats are present and the parts can be rotated or prevented from rotating.

It can be seen that there is disclosed a wedge-type fastener that can be used to fasten two sheets together temporarily, then released thereform. The fastener has a gripping range suitable for many applications but presents a lower profile enabling it to be used in many applications, particularly where automatic installation of permanent fasteners are desired. The fasteners disclosed herein can be used to hold abutting sheets together in a temporary manner while permanent installation of fasteners is made.

We claim:

1. A wedge-type fastener comprising:
   a main body portion having a first internally threaded interior section and a second smooth walled interior section;
   a screw member having external threads adapted to engage and mate with the threaded interior section of said body portion, said screw member being mounted within said body portion and movable from a first position disposed in said smooth walled section to a second position threadably engaging said threaded interior section;
   a pair of spaced wire members fixedly mounted at one end in said screw member;
   a spacer loosely disposed between said wire members movable between a first position totally contained within and between said wire members when said screw member is in said first position and to a second position forcing said wire members apart and extending out of the end of said wire members remote from the ends thereof mounted to said screw member when said screw member moves to said second position; and
   an end cap having said wire members extending therethrough encircling both said wire members and said body member and fixedly secured to said body member.

2. In the fastener of claim 1 including resilient means disposed between said screw member and said end cap.

3. In the fastener of claim 2 including a thrust washer disposed between said body member and said end cap.

4. In the fastener of claim 3 wherein said resilient means is a spring abutting at one end against said screw member and at the other end being adapted to abut against said thrust washer.

5. In the fastener of claim 1 wherein said body member includes a hexagonally shaped outer surface.

6. In the fastener of claim 1 wherein said end cap includes a hexagonally shaped outer surface.

7. In the fastener of claim 1 wherein said screw member includes a hexagonally shaped cavity at the end thereof remote from the ends of said wire members remote from said screw member.

8. In the fastener of claim 1 wherein both said body member and said end cap have wrenching flats on the outer surface thereof.

9. In the fastener of claim 1 wherein said end cap is an open ended cap having a generally cylindrical body with a wall closing off one end, said wall having a centrally located aperture receiving said wire member therethrough.

10. In the fastener of claim 9 wherein said cap body includes a first outer hexagonally shaped portion and an integral outer smooth-walled portion, said smooth-walled portion extending toward said body member.

* * * * *